Nov. 10, 1953  D. E. CHAPPELL  2,658,281
LINEAR SCALE WITH MICROMETER ATTACHMENT
Filed Dec. 13, 1952
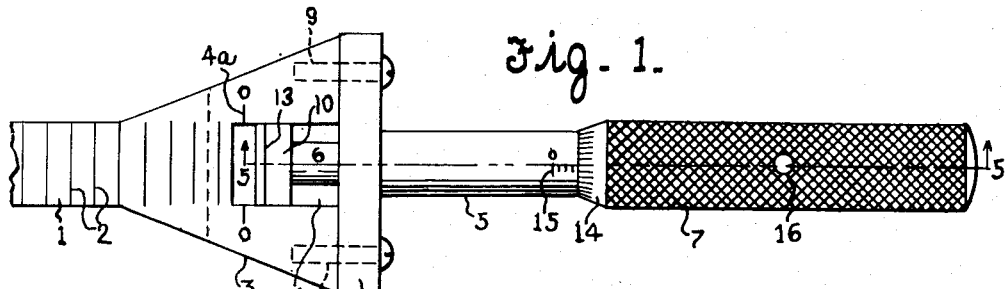
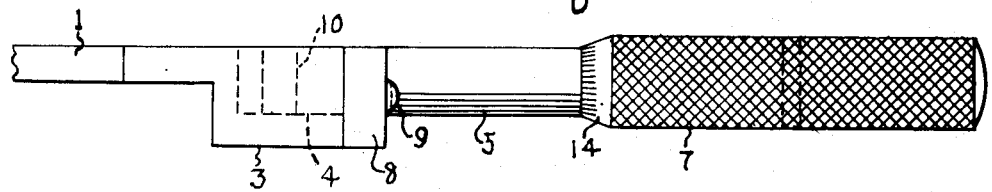
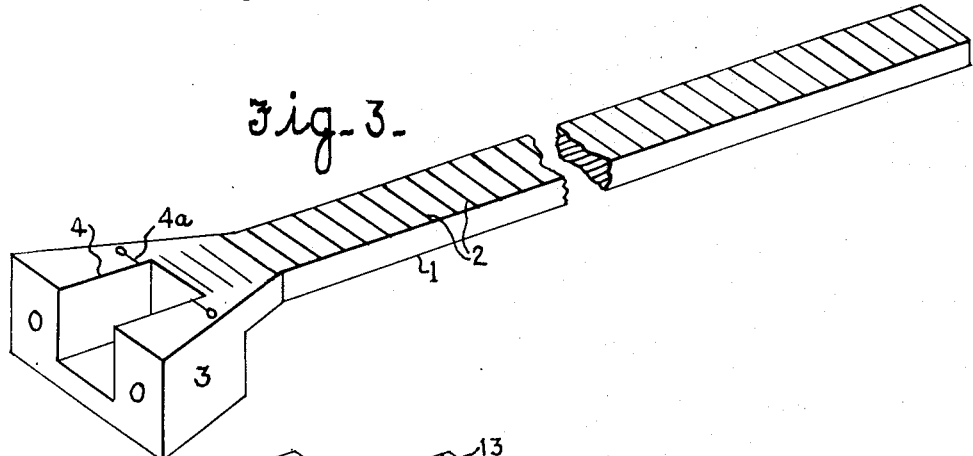
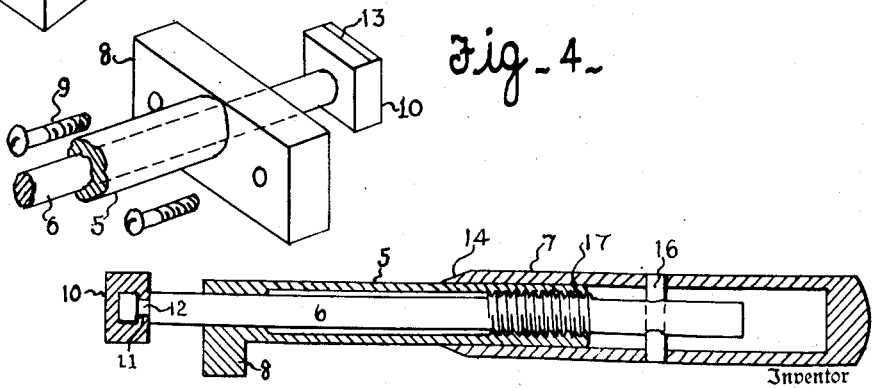
Inventor
Donald E. Chappell
J. S. Murray
Attorney

UNITED STATES PATENT OFFICE 2,658,281

LINEAR SCALE WITH MICROMETER ATTACHMENT

Donald E. Chappell, Detroit, Mich.

Application December 13, 1952, Serial No. 325,831

1 Claim. (Cl. 33—107)

This invention relates to linear scales and particularly to micrometer attachments for such scales. Scales now available for use in shops and drafting rooms are not suited to fine measurements, the smallest units of graduation of such scales being usually sixty-fourths of an inch.

An object of the invention is to so attach a micrometer to one end of a scale that much finer measurements may be taken than would otherwise be afforded by the scale.

Another object is to adapt a micrometer to be attached to a scale in a simple and relatively inexpensive manner, affording accurate adjustment of the micrometer to obtain relatively fine measurements.

Another object is to attach a micrometer to a scale as an endwise extension of the latter, such micrometer having a connection from its rotating spindle to a measuring block slidably mounted in the scale, whereby the block is actuable lengthwise of the scale, while restrained from rotation.

These and various other objects are attained by the construction hereinafter described and illustrated in the accompanying drawing wherein:

Fig. 1 is a top plan view of a scale equipped with my micrometer attachment.

Fig. 2 is a corresponding side elevational view.

Fig. 3 is a perspective view of the scale omitting the attachment.

Fig. 4 is a perspective view of the attachment omitting the scale.

Fig. 5 is a longitudinal vertical sectional view of the attachment taken on the line 5—5 of Fig. 1.

In these views the reference character 1 designates a scale graduated as at 2 in units too large for measurements involving small decimals or fractions, such as thousandths of an inch. An end portion of the scale 1 is enlarged laterally and downwardly as indicated at 3 and a rectangular pocket 4 extends centrally into such portion from its top face and end. The zero marking 4a of the graduations 2 preferably laterally adjoins said pocket.

An endwise micrometer extension from the scale 1 comprises a barrel 5, a spindle 6 slidable within said barrel, and a thimble 7 slidably and rotatively embracing the barrel. Terminally formed on the barrel is an enlargement bridged across said pocket and comprising a pair of opposed lugs 8 abutting the enlarged end 3 of the scale and rigidly secured to such end by studs 9. The spindle 6 has its front end portion projecting through the terminal enlargement 8 into the pocket 4 and connected to a rectangular measuring block 10 slidably fitted in the pocket. Preferably the spindle extends rotatively into the block, compelling the block to participate in sliding travel of the spindle. One way of establishing such a connection is to form the block with an annular interior flange 11 set into an annular groove 12 of the spindle (Fig. 5). The top face of the block 10 occupies the same plane as the graduated face of the scale and is formed with an indented line 13 transverse to the scale and adapted to register with the zero marking of the scale 2. When such registration occurs the block 10 will preferably abut the front or end face of the pocket 4.

The front end of the thimble 7 has the usual annular bevel 14 and usual graduations whereof there are preferably twenty-five. The annular scale thus formed is to be read in conjunction with a scale 15 longitudinally extending on the barrel 5. The units of the scale 15 preferably equal .025 inch. The thimble 7 serves to actuate the spindle 6, being rigidly secured to the latter as by a pin 16. Intermeshed threads 17 are formed respectively on the barrel and spindle whereby the spindle will be advanced or retracted longitudinally, when rotated by the thimble, the thread pitch being such that each revolution of the spindle moves the latter .025 inch along its axis. Each unit of the circular scale at 14 indicates $\frac{1}{25}$ of .025 or .001 inch.

When the described micrometer attachment is set at zero, the index line 13 of the measuring block registers with zero of the graduations 2. This assures a position of the spindle 6 and thimble 7 such as to register zero on the annular scale at 14 with zero of the scale 15. Travel of the block 10 from its zero position represents the excess in thousandths of an inch, readable on the scales 14 and 15, of a required measurement over such portion of the measurement as can be read on the graduations 2.

The described attachment is suited to inexpensive production and adds greatly to the utility of such scales as are now available.

What I claim is:

A linear measuring device comprising a scale having an enlarged portion adjoining an end of such scale and having a rectangular pocket opening into such portion from said end and having a set of graduations extending lengthwise of the scale substantially from said pocket, a measuring block slidable in said pocket lengthwise of the scale and having a top face substantially in the plane of the graduated face of the scale and having an index mark registrable with zero of the scale graduations, a barrel forming an endwise extension from said enlarged end portion, such barrel having a terminal enlargement abutting said end of the scale and bridged across said pocket, means rigidly securing said terminal enlargement to the scale, a spindle rotatable in and having a screw threaded connection to the barrel and projecting through said terminal enlargement into said pocket, a connection from the spindle to the measuring block establishing a unison of sliding travel between the spindle and block and affording the spindle rotation relative to the block, a thimble slidably and rotatively embracing the barrel, and means for rotatively actuating the spindle from the thimble, the thimble having a circularly graduated end, and the barrel having index means correlated with the thimble graduations.

DONALD E. CHAPPELL.

References Cited in the file of this patent

UNITED STATES PATENTS

| Number | Name | Date |
|---|---|---|
| 827,443 | Henrikson | July 3, 1906 |
| 1,379,878 | Rouanet | May 31, 1921 |
| 2,434,633 | Amador | Jan. 20, 1948 |
| 2,525,186 | Sosdian | Oct. 10, 1950 |